United States Patent [19]

Maloy

[11] 4,189,702
[45] Feb. 19, 1980

[54] COMMUTATOR AND FIBER BRUSH ROTATING DISC

[75] Inventor: Rex M. Maloy, Broken Arrow, Okla.

[73] Assignee: Lowrance Electronics, Inc., Tulsa, Okla.

[21] Appl. No.: 945,485

[22] Filed: Sep. 25, 1978

[51] Int. Cl.$^2$ ............................................. G01S 7/56
[52] U.S. Cl. ................................. 367/109; 310/232; 310/253; 339/5 R; 339/6 R
[58] Field of Search ............... 310/232, 248, 249, 251, 310/252, 253; 339/5 R, 6 R, 6 A, 6 RL, 8 R, 8 A, 8 PB, 9 E; 340/3 C

[56] References Cited

U.S. PATENT DOCUMENTS

| | | | |
|---|---|---|---|
| 3,122,719 | 2/1964 | Grieg | 340/3 C |
| 3,191,084 | 6/1965 | Ooka et al. | 310/252 X |
| 3,382,387 | 5/1968 | Marshall | 310/251 |
| 3,886,386 | 5/1975 | Hillig | 310/251 |
| 3,891,868 | 6/1975 | Joyce | 310/308 |
| 4,140,832 | 2/1979 | Menegay | 310/253 X |

Primary Examiner—Richard A. Farley
Attorney, Agent, or Firm—Head & Johnson

[57] ABSTRACT

An improved slip ring and brush assembly such as for carrying the return signal pulse to a glow discharge tube on a rotating disc sonar. The rotating disc is made of insulating material and has a cylindrical hub which is adapted to fit over a corresponding hub on a motor shaft. Annular slip rings made of conductive plastic are adapted to slip over the cylindrical hub and are indexed against relative rotation by means of cylindrical bulges or projections on opposite sides of the hub. These projections serve to carry the electrical connections, in the form of threaded screws and springs that are adapted to contact the slip rings, one set for one slip ring, and the other for the other slip ring. The slip rings are separated by thin insulating washers of larger diameter than the rings. The brushes are made of graphite fibers and have excellent flexibility, conductivity and long life.

10 Claims, 3 Drawing Figures

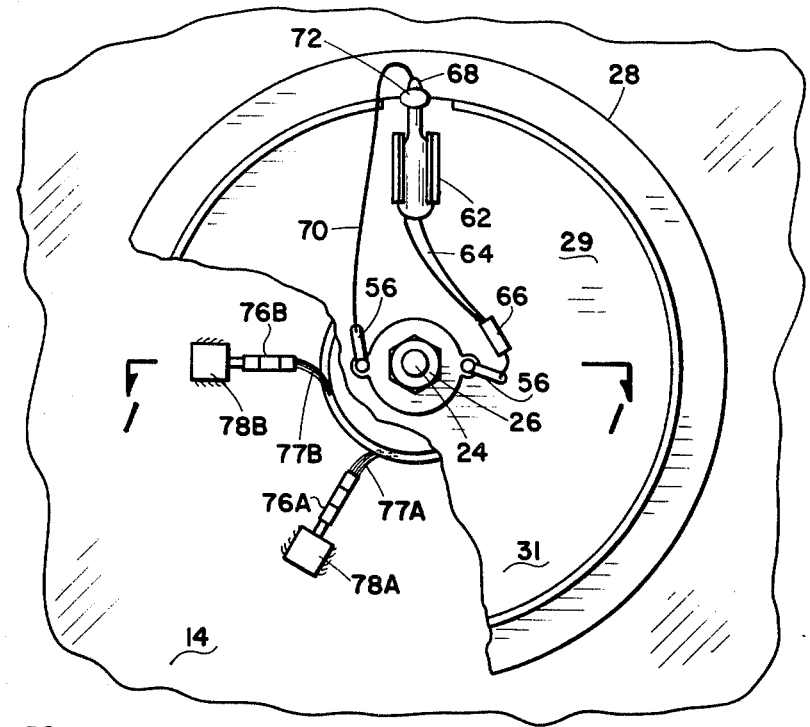
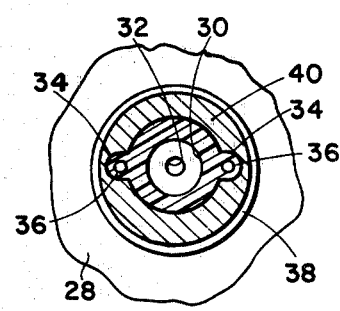
Fig. 2
Fig. 3
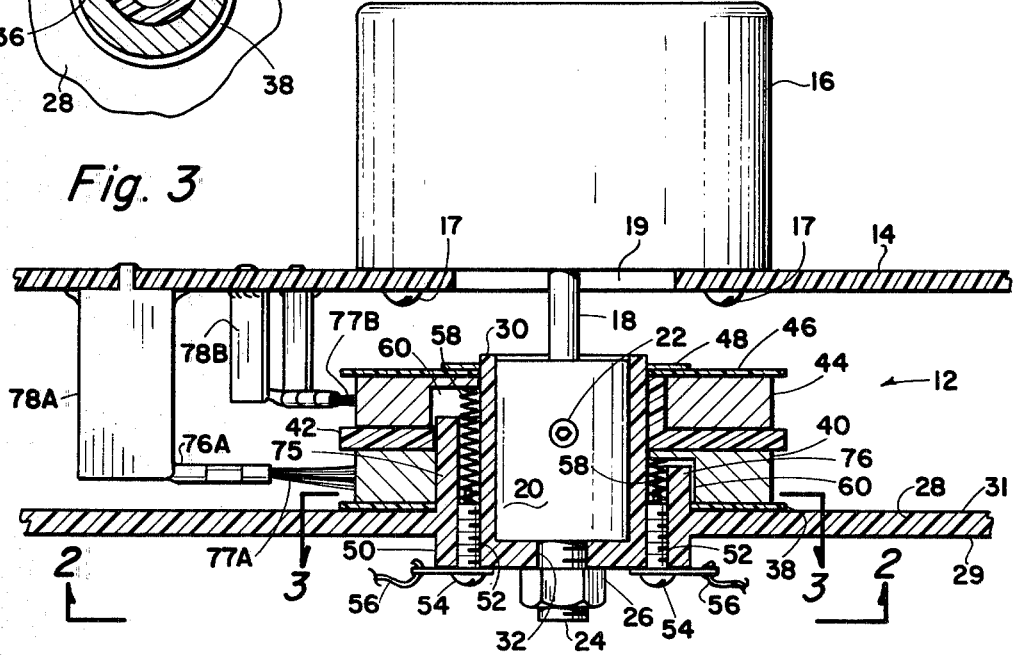
Fig. 1

COMMUTATOR AND FIBER BRUSH ROTATING DISC

BACKGROUND OF THE INVENTION

1. Field of the Invention

This invention lies in the field of slip rings and brushes, for noise-free operation of sliding electrical contacts under low current operation.

More particularly, this invention relates to rotating electrical contacts such as used in the art of sonar signalling and display.

More particularly, this invention relates to a sonar sound ranging apparatus including a visual display disc which carries a glow tube for the purpose of producing a pulse of light on receipt of an electrical pulse generated by the returned sonar pulse in the water. The brushes and slip rings are required to carry the returned sonar pulse signal to the rotating disc, which carries the glow tube.

2. Description of the Prior Art

In the prior art there have been numerous sonar display units which utilize a rotating disc for timing the instant of transmission of a sonar pulse in the water at one point in the disc rotation, and creating a pulse of light at a second time delayed by the travel time of the sonar pulse, the position of the disc at the instant of receipt of the reflected sonar pulse being a measure of the travel time of the sonar pulse.

One of the major problems with this type of equipment, however, is the manner of getting the electrical return pulse signal to the glow tube mounted on the rotating disc. Troubles in the nature of corrosion of metal connectors, fatique of brushes, noise due to the low current transmission, etc. have been common to these designs.

It is the purpose of this invention to provide a design which is a major improvement over the existing designs.

SUMMARY OF THE INVENTION

It is a primary object of this invention to provide a slip ring and brush system for carrying low current electrical pulses through brushes and slip rings to a rotating element.

This and other objects are realized and the limitations of the prior art are overcome in this invention by using a design for the slip rings and brushes which provides relatively noise-free conduction of small currents, through the brushes and slip rings, while providing ruggedness and long life and freedom from corrosion problems, etc. as well as low frictional drag on the rotating system.

The apparatus comprises a support plate which carries a driving motor, and a hub attached to the shaft of the motor. The rotating disc is molded of insulating plastic material and has a front surface and a back surface. The back surface carries a hub with a cylindrical axial opening, adapted to fit over and be attached to the hub on the motor shaft. The outside cylindrical surface of the hub has, on opposite sides of the cylindrical housing, short cylindrical members or projections, of small diameter, which are adapted to index the collector rings, which are annular rings of a selected material, which are shaped to slip over the outer contour of the hub and be indexed by the projections to rotate securely with the hub.

The small cylindrical longitudinal projections on the two sides of the hub serve also for carrying an electrical conductor down through a bored opening in each of the projections to contact one of the rings, each hub projection then serves for one of the two rings. The contact is made by a small diameter elongated helical spring of conducting metal which is held in place in the opening by means of a screw threaded into openings in the front surface of the disc. The slip rings are separated by means of thin insulating washers which have larger diameter than slip rings, so as to confine the brushes solely to the space between two washers, and to the single slip ring between those two washers.

This is important because the brushes are made of long flexible fibers of graphite, which, because of their flexibility, might otherwise move over to contact the second of the two slip rings. The central insulating washer, of course, prevents this. The graphite fibers are clamped in a small metal tube which is attached to the support plate.

Mounted on the front surface of the disc is a small neon flash tube, or glow tube, and leads are connected from the two ends of the glow tube to the two screws which are internally connected, one to each of the two slip rings.

BRIEF DESCRIPTION OF THE DRAWINGS

These and other objects and advantages of this invention and a better understanding of the principles and details of the invention will be evident from the following description taken in conjunction with the appended drawings in which:

FIG. 1 represents in cross section a view of one embodiment of this invention.

FIG. 2 illustrates in partial plan view the same embodiment of this invention.

FIG. 3 illustrates in an enlarged manner the details of shape and position of the slip rings, etc.

DESCRIPTION OF THE PREFERRED EMBODIMENTS

Referring now to the drawings, there is shown a mounting illustrated by numeral 10, one embodiment of this invention.

Numeral 12 indicates generally the slip ring and brush portion of the invention. A mounting or support plate 14 is provided which is not only the support for the drive motor that rotates the disc display unit, but is also an electronic circuit board, on which leads are provided for all of the electronic apparatus, as well as the supports for the brushes, and so on.

The drive motor 16 is mounted, by means of screws 17 or other means, to the support plate 14. The shaft 18 passes through an opening 19 through the board support plate 14 and carries an enlarged hub 20, to the shaft 18, which is held by means of a set screw or other means 22. The hub 20 carries an axial threaded projection 24, which serves, by means of lock nut 26, to lock a rotating disc display device 28 onto the hub 20 of the motor.

The disc 28 has a front surface 29 to which the display glow tube 68 is attached, and a back surface 31 which carries the slip rings, etc. The disc 28 is molded from an insulating plastic, which carries on its back surface a cylindrical hub 30, which has an internal cylindrical opening adapted to securely slide over the hub 20 of the motor. There is an axial opening 32 through the center of the disc, through which projects the threaded extension 24, so that when the disc is pressed over the motor hub it can be locked in position by the nut 26.

By referring to FIG. 3 which is a cross-section taken across the plane 3—3 of FIG. 1, there is seen the opening 32 through the disc 28, the interior wall of the cylindrical hub on the back surface of the disc. This circular hub 30 has two longitudinal projections 34 on diametrically opposite positions on the hub. These are shown as 34, and each has a drilled opening 36. The end 52 of the opening 36 close to the front surface of the hub is threaded to receive a screw 54. The screws 54 each serve to press on a metallic helical spring 58 which acts as a conductor from the screw 54 to one, or the other, or the two slip rings 44 and 40.

The longitudinal projections 34 of the hub 30 serve not only to carry the electrical leads to the slip rings, but also serve to lock the slip rings, which are annular rings of a conducting metal, from turning with respect to the disc.

It will be seen that the hub projection 75 which serves to carry a lead to the slip ring 44 is longer than the corresponding projection 76 on the opposite side of the main hub 30. Thus the projection 75 passes all the way through the slip ring 40 and projects into a small cavity in the slip ring 44, where the contact is made between the spring 58 and the slip ring. On the other side of the hub the spring contacts the slip ring 40 in a shallow opening 60.

Insulating washers 38, 42, and 46 are provided on outer sides of the slip rings and between the two slip rings, to isolate each of the slip rings from accidental contact to both of them by one or the other of the two brushes. In other words, the brushes 77A and 77B are restrained by the insulating washers 38, 42, and 46 to contact only one, or the other, of the slip rings 40, 44.

The brushes 77A and 77B are made of long fibers of graphite, which provide excellent contact, by the flexibility of the fibers, and noise-free electrical contact with the slip rings. The fibers are bound and crimped in a small tubular metallic terminal 76A and 76B respectively and are attached by solder or other means to posts 78A and 78B which are attached by solder or other means to the circuit board and support plate 14.

On the front side 31 of the disc 28, as shown in FIG. 2, is mounted a small gas glow tube, or discharge tube, 68 which is well known in the art and serves, on receipt of an electrical pulse, to provide a very short time duration pulse of light, to indicate the precise angular position of the discharge tube at the instant of receipt of the electrical pulse.

This tube 68 is attached by means such as a metal clip 62, or other means, to the front surface of the disc, and the two leads 70 and 64 from the discharge tube 68 are carried to the two lugs 56 held under the mounting screws 54 which individually contact the slip rings. Element 66 is a series resistor, if desired.

One of the difficult problems of the prior art devices is that due to corrosion of the prior art metal collector rings. Particularly since these sonar devices are utilized in the high humidity locations aboard a ship or boat. It has been found that a material known as conductive polypropylene plastic, such as manufactured by A. Schulman Inc. and identified as their No. 350-35 has ideal electrical characteristics and is non-corrosive, and in conjunction with the brushes which are made of graphite fibers, provides a low noise conducting action for small currents. The large number of individual graphite fibers and their elastic nature provides for a great number of individual contacts between the brush elements and the slip ring so that problems due to bouncing, or dirt, or other means that would be disastrous for a conventional type of slip ring and brush arrangement, are not present in this invention.

The slip rings may be made of any conductive matter, including metal, carbon, or conductive plastic. Conductive plastic has advantages in that it is inexpensive to produce in desired configurations, is non-corrosive, and has good wear characteristics.

The invention has been described as it is particularly applicable to rotating disc sonar apparatus, but it is understood that this is by way of example and that the invention may be applied to other apparatus in which an electrical signal is conveyed between a stationary and a rotating device.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. In a sonar underwater sound ranging apparatus, including a rotating visual display disc, including means on said disc for generating the initiating pulse to transmit the sonar signal, and including glow discharge tube means for indicating by a pulse of light the instant of reception of a reflected sonar pulse, the improvement in slip ring and brush assembly to carry the electrical reception signal to said glow discharge tube, on said rotating disc, comprising;

(a) a support plate, a driving motor attached to said support plate and having a projecting shaft;

(b) a rotating disc of insulating material, having a front surface and a back surface, and having a central cylindrical hub having a central opening on said back surface, adapted to fit over said motor shaft, and to be removably attahced thereto, the outer contour of said disc hub being cylindrical with two small diameter longitudinal cylindrical projections along diametrically opposite edges of said cylindrical surface; a small diameter hole drilled axially through each of said small projections;

(c) a first conducting ring adapted to be positioned over the outside contour of said hub on said back surface;

(d) contact screw and spring means in the hole in a first small cylindrical projection to connect from the front surface of said disc to said first ring;

(e) a second conducting ring adapted to be positioned over the outside contour of said hub on said back surface;

(f) contact screw and spring means in the hole in the second small cylindrical projection, to connect from the front surface of said disc to said second ring;

(g) flexible brushes of conductive fiber material supported on said support plate and adapted to separately contact one of said first and second rings; and (h) means to mount said glow discharge tube on the front surface of said disc, to connect each of the two terminals of said tube to one or the other of said contact screw and spring means.

2. The apparatus as in claim 1 in which said slip rings are separated by and enclosed on their outside surfaces by insulating annular discs of larger O.D. than said rings.

3. The apparatus as in claim 1 in which said slip rings are made of conducting plastic.

4. The apparatus as in claim 1 in which said brushes are made of a bundle of thin graphite fibers.

5. The apparatus as in claim 1 including cylindrical hub means on said motor shaft, and means on said disc to slip over said motor hub and be attached thereto.

6. In a sonar apparatus having means of generating and receiving sonar signals and a circuit for converting received sonar signals to electrical signals, and having a rotating disc with optical signalling means thereon, the improved means of transmitting electrical signals to the optical signalling means comprising:

at least one slip ring supported coaxially and rotated with the disc, and conductor means electrically communicating each slip ring with the optical signalling means; and a separate brush for each said slip ring, each brush being formed of a bundle of flexible conductive fibers bound at one end by a rigid tubular metallic terminal, the fibers extending from the tubular terminal to flexibly engage said slip ring, the tubular terminal of each brush being stationary and connected to the circuit means, the flexible conductive fibers carrying electrical signals to said slip ring.

7. The improvement in sonar apparatus of claim 6 wherein said slip rings are made of conductive plastic.

8. The improvement in sonar apparatus of claim 6 in which each said brush is made of a bundle of thin graphite fibers.

9. The improvement in sonar apparatus according to claim 6 including two slip rings mounted coaxially with said disc and insulated from each other and conductor means from each slip ring to said optical signalling and separate stationary flexible brushes contacting said slip rings.

10. The improvement in sonar apparatus according to claim 6 wherein said optical signalling means is in the form of a glow discharge tube.

* * * * *